Figure 1:
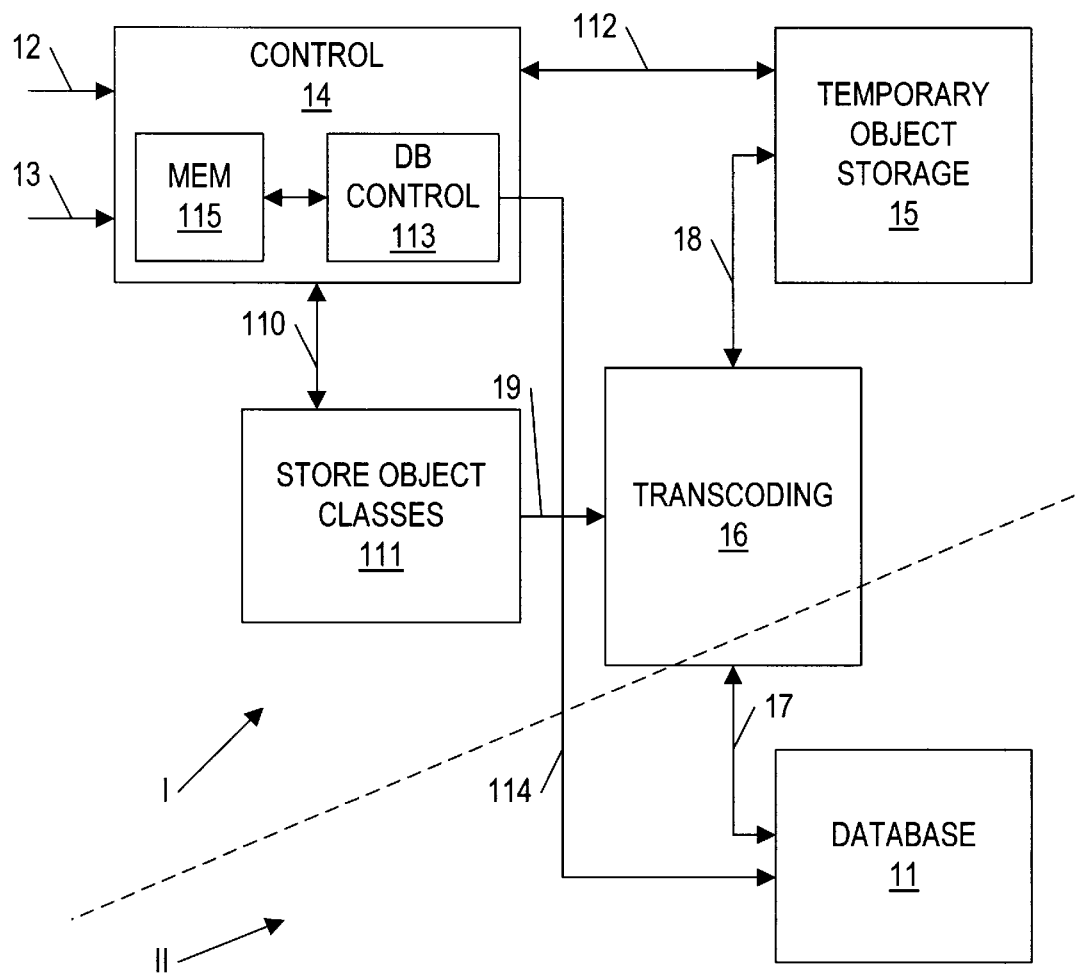

United States Patent [19]

Miginiac et al.

[11] Patent Number: 5,909,683
[45] Date of Patent: Jun. 1, 1999

[54] RELATIONAL DATA BASE CONTROL SYSTEM USING OBJECT ORIENTED ACCESS LOGIC TO LIMIT THE DATA BASE ACCESS COUNT, AND CORRESPONDING METHOD

[76] Inventors: Jean-Charles Miginiac, 25, Rue Galilee, Pontault-Combault, F-77340; Michel Planard, 18, Rue Du Docteur Leon-Deglaire, Montgeron, F-91230, both of France

[21] Appl. No.: 08/640,915

[22] PCT Filed: Nov. 3, 1994

[86] PCT No.: PCT/FR94/01274

§ 371 Date: Dec. 10, 1996

§ 102(e) Date: Dec. 10, 1996

[87] PCT Pub. No.: WO95/12855

PCT Pub. Date: May 11, 1995

[30] Foreign Application Priority Data

Nov. 5, 1993 [FR] France .................................. 93/13488

[51] Int. Cl.$^6$ ..................................................... G06F 17/30
[52] U.S. Cl. ........................................... 707/103; 707/203
[58] Field of Search ................................. 707/4, 10, 100, 707/103, 203

[56] References Cited

U.S. PATENT DOCUMENTS

| | | | |
|---|---|---|---|
| 5,212,787 | 5/1993 | Baker et al. ................................ | 707/4 |
| 5,499,371 | 3/1996 | Henniger et al. ........................ | 395/702 |
| 5,542,078 | 7/1996 | Marsel et al. ............................ | 707/101 |
| 5,564,113 | 10/1996 | Bergen et al. .............................. | 707/4 |
| 5,627,979 | 5/1997 | Chang et al. .............................. | 345/335 |
| 5,689,698 | 11/1997 | Jones et al. ................................ | 707/4 |

OTHER PUBLICATIONS

Barsalou, T. et al., "Complex objects for relational databases," 8340 Computer–Aided Design, Oct. 22, 1990, No. 8, London, GB, pp. 458–468.

Wiederhold, Gio, "Views, Objects, and Databases," 8153 Computer, Dec. 19, 1986, No. 12, New York, NY, USA, pp. 37–44.

Shah, Abad A., et al., "Renovation of Complex Objects in the Temporal Object System," Mar. 23, 1993, 12$^{th}$ Annual International Phoenix Conference on Computers and Communications, Tempe, Arizona, pp. 203–209.

Notification of Transmission of Preliminary Examination Report for PCT/FR94/01274 dated Dec. 28, 1995.

*Primary Examiner*—Paul V. Kulik
*Attorney, Agent, or Firm*—Conley, Rose & Tayon; Eric B. Meyertons

[57] ABSTRACT

The invention concerns a relational data base control system stored in a first storage unit (11) controlled in accordance with a first relational access logic, and including at least a series of records, each of the records being associated with an object including at least one variable and at least one method used to affect the value of at least one of the variables, data retrievals and/or modifications being made solely on the objects in accordance with a second object oriented access logic, the system comprising:

a second temporary object storage unit (15);

a control unit (14) including an automatic command generator unit (113) to be used in the data base according to the first access logic starting from commands corresponding to the second access logic;

a data transfer unit (16) transferring data in each direction between the first storage unit (11) and the second storage unit (15), data transfers between the first and the second storage units (15) being controlled by the automatic command generator unit (113) in order to limit the number of accesses to the first storage unit (11).

10 Claims, 3 Drawing Sheets

RELATIONAL DATA BASE CONTROL SYSTEM USING OBJECT ORIENTED ACCESS LOGIC TO LIMIT THE DATA BASE ACCESS COUNT, AND CORRESPONDING METHOD

This invention concerns the design, development and use of computer systems. More precisely, the invention concerns control, in other words particularly retrieval and updating of relational data bases.

There are many known data base management systems. In general, they are based on a plane relational approach to storage memory. Storage memory is divided into tables, records and then data fields. Using these systems is complex and difficult to learn, for application developers and for final users. In particular, it requires good knowledge firstly of the data base structure and secondly of useable orders or requests.

Several tools have been suggested to simplify use of these relational data bases. Thus there are high level languages, compilers, code generators, man/machine interfaces, etc. However in all cases, they are simply intermediate layers added between the user and the data base. It is still necessary to know the data base structure, particularly relations defined between these data.

Furthermore, in conventional data base management systems there is a very large number of read and write accesses to the data base. Each retrieval and each modification requires an access to the data base storage unit. This has a number of disadvantages, particularly the increase in processing time (access times can be very long, particularly if the data base is remote), an increase in the processing cost (if accesses to the data base are charged and/or if it is accessed through a paying network), wear of storage units, etc.

One of the main objectives of the invention is to overcome these disadvantages of prior techniques.

More precisely, a first objective of the invention is to provide a relational data base control system capable of limiting the number of accesses to this data base. In other words, the purpose of the invention is to provide a system that requires far fewer accesses to the data base for a given application than are necessary with known systems.

The document "Complex Objects for Relational Databases" (T. Barsalou and G. Wiederhold—Computer Aided Design, Vol. 22, No. 8, October 1990, p. 458–68) thus describes a system whereby a data base can be retrieved either using classical relational method, or using an object oriented method. However, with this technique the user must be familiar with and must be capable of using the relational data base structure.

The document "View, Objects and Databases" (G. Wierderhold—Computer, Vol. 19, No. 12, December 1986, p. 37–44) describes a similar system.

Another purpose of the invention is to provide a system for which it is completely unnecessary to have any knowledge about the structure of the data base and relations defined between data.

Another objective of the invention is to provide a system capable of easily managing data in time, and particularly authorizing retrievals at simulated past or future dates, and retroactive modifications. Furthermore, a complementary objective of the invention is to allow interaction of this type of retroactive modification on all data.

A history management technique is already known and is described in "Renovation of Complex Objects in the Temporal System" (A. Shah et al.—12th Annual International Phoenix Conference on Computers and Communications, Mar. 23 1993, Tempe, Ariz., p. 203–209). It is based on the concept of an objects family, all previous states of each object being fully memorized. This technique returns into the past, and occupies a large amount of memory.

These objectives, and others which will become evident later, are achieved in the invention through a relational data base control system that limits the number of accesses to the said data base, the said data base being stored in a first storage unit controlled according to a first relational access logic and including at least one series of records, each of the said records including at least one data field, a system in which each of the said records is associated with an object including at least one variable and at least one method of affecting the value of at least one of the said variables, and wherein data retrievals and/or modifications are made only on the said objects, based on a second object oriented access logic, the said system comprising:

a second temporary storage unit for objects;

a control unit including:

a unit for defining object classes, an object class defining an object structure, and means of creating instances of a class, or objects, from one of the said object classes;

a unit for retrieving and modifying at least one variable in at least one object stored in the said second temporary storage unit, in accordance with the said second access logic, using the said methods;

a unit for automatically generating commands to be used with the said data base, in accordance with the said first access logic, starting from commands corresponding to the said second access logic; and a unit for transferring data from the said first to the said second storage units, or from the said second to the said first storage unit, and associating a record in the said data base with the said objects by transcoding, said record including at least one field corresponding to a variable of the said object, the said transcoding being a function of the class of the corresponding object, data transfers between the said first and second storage units being controlled by the said automatic command generator unit so as to limit the number of accesses to the said first storage unit.

Thus, control of the data base is very much simplified. There is no need to know the structure of the base, or the access commands to this data base. The user only manipulates objects, using an approach usually referred to as "object oriented." The system according to the invention itself automatically and transparently transfers and transcodes objects and the corresponding records.

Furthermore, according to the invention, objects and records are stored completely separately. Objects are stored in the second temporary storage unit, and records are stored in the first data base storage unit. The user can only access the second storage unit containing objects.

Therefore, the system comprises a data transfer unit transferring data between the first and second storage units, which rebuilds objects making use of records stored in the data base and the structure of the corresponding object class, and then stores these rebuilt objects in the temporary storage unit. Conversely, the transfer unit transcodes modified objects in records to be stored in the first storage unit.

These transfer or transcoding operations are completely transparent to the user. The user works on objects contained in the second storage unit. Thus the number of data base accesses is limited.

In particular, the system in the invention can manage work sequences, called events, and the said automatic command generator unit sending a data transfer command to transfer from the second storage unit to the first storage unit only when an event is terminated. In this way several modifications can be made on an object during an event, but there will only be one write operation in the data base at the end of the event.

Advantageously, the control unit includes a lock management unit preventing a record in the said data base from being modified when an object associated with the said record is stored in the second storage unit and was modified by the said retrieval and modification unit.

Furthermore, in a preferred embodiment of the invention, the said system includes a history management unit for at least some of the said objects, associating at least one variable of the said objects with at least two distinct values, each of the said values being associated with at least one technical field bearing a date representing the validity of the said value.

Thus, making retrievals on data is no longer plane. A retrieval can fictitiously be made at any instant in time (in the past or in the future). Furthermore, modifications can be made retroactively and can occur at a chosen instant in the past.

It is beneficial if at least some of the said values are associated with two technical fields, one knowledge date field representing the date on which the said value was known, and an effective date field representing the date on which the said value became effective.

In many applications, and particularly management applications, it is important to know and to make a distinction between the knowledge date and effective date.

Preferably, the said automatic command generator unit includes a cache memory storing a series of commands that were generated in advance. In this way, creating commands is made easier.

The invention also concerns a relational data base control process corresponding to the system described above. In particular, this process includes a step for loading at least one object in the second temporary storage unit, including the following steps:

read a record corresponding to one of the said objects in the first storage unit;

first transcoding of the said record to the said object as a function of the class structure of the said object, at least some of the variables of the said object corresponding to at least some data fields in the said record;

write the object into the second temporary storage unit. The save is done symmetrically in the first storage unit.

Preferably, at least some of the said objects comprise;

at least one stored variable corresponding to a data field in the record associated with the said object; and at least one deductive variable, the value of which is determined when the said first transcoding step, starting from the value of at least one data field in the record associated with the said object and/or the class structure of the object.

Preferably, in order to limit accesses to the relational data base, a search for at least one object satisfying a predetermined condition is carried out in two steps;

Firstly, a search among objects stored in the second storage unit; and

If the search is not terminated, a second step consisting of a search among records stored in the said first storage unit.

Figure 2:
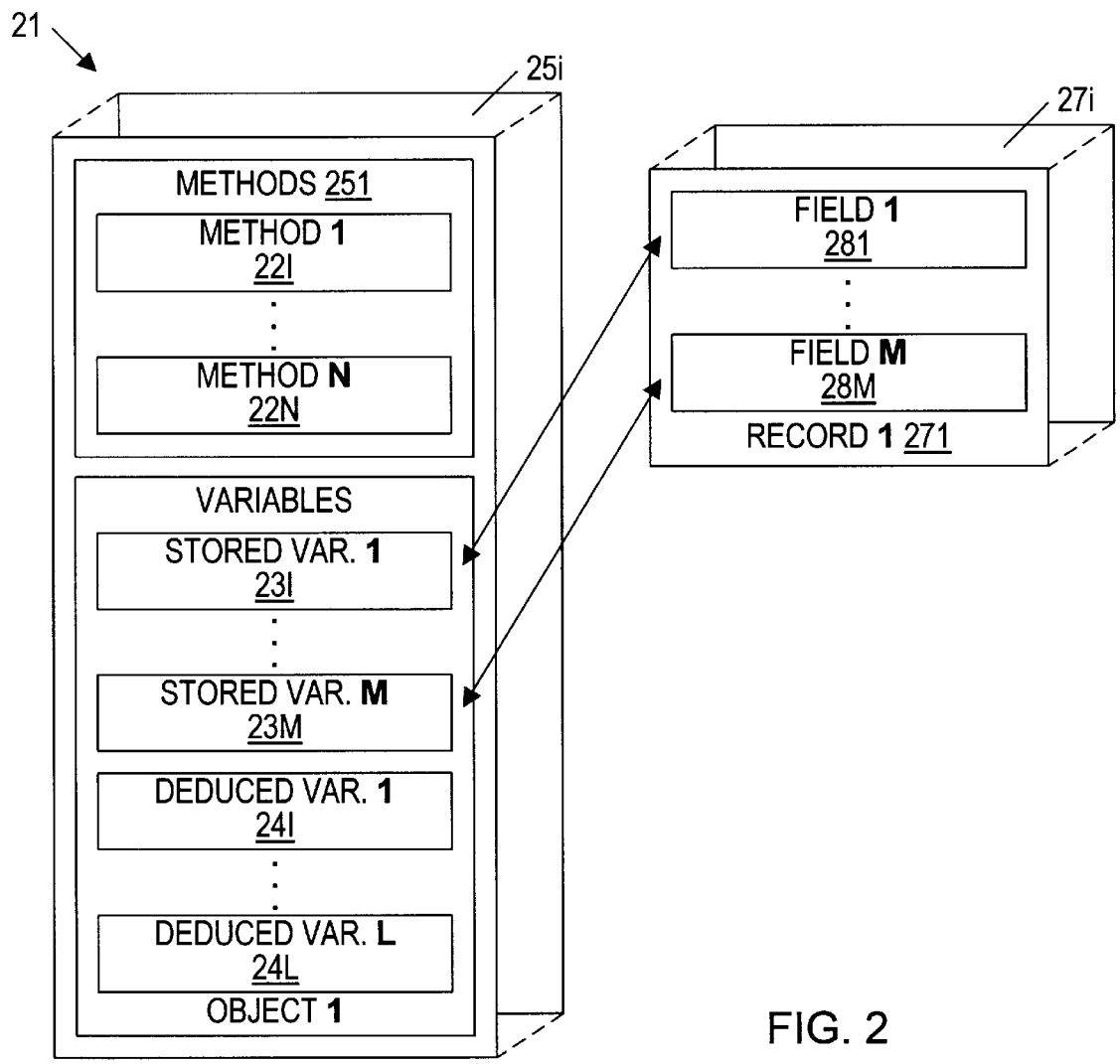
Figure 4:
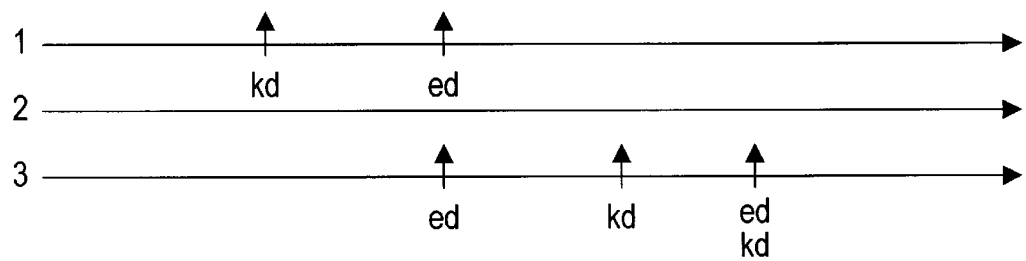
Figure 3:
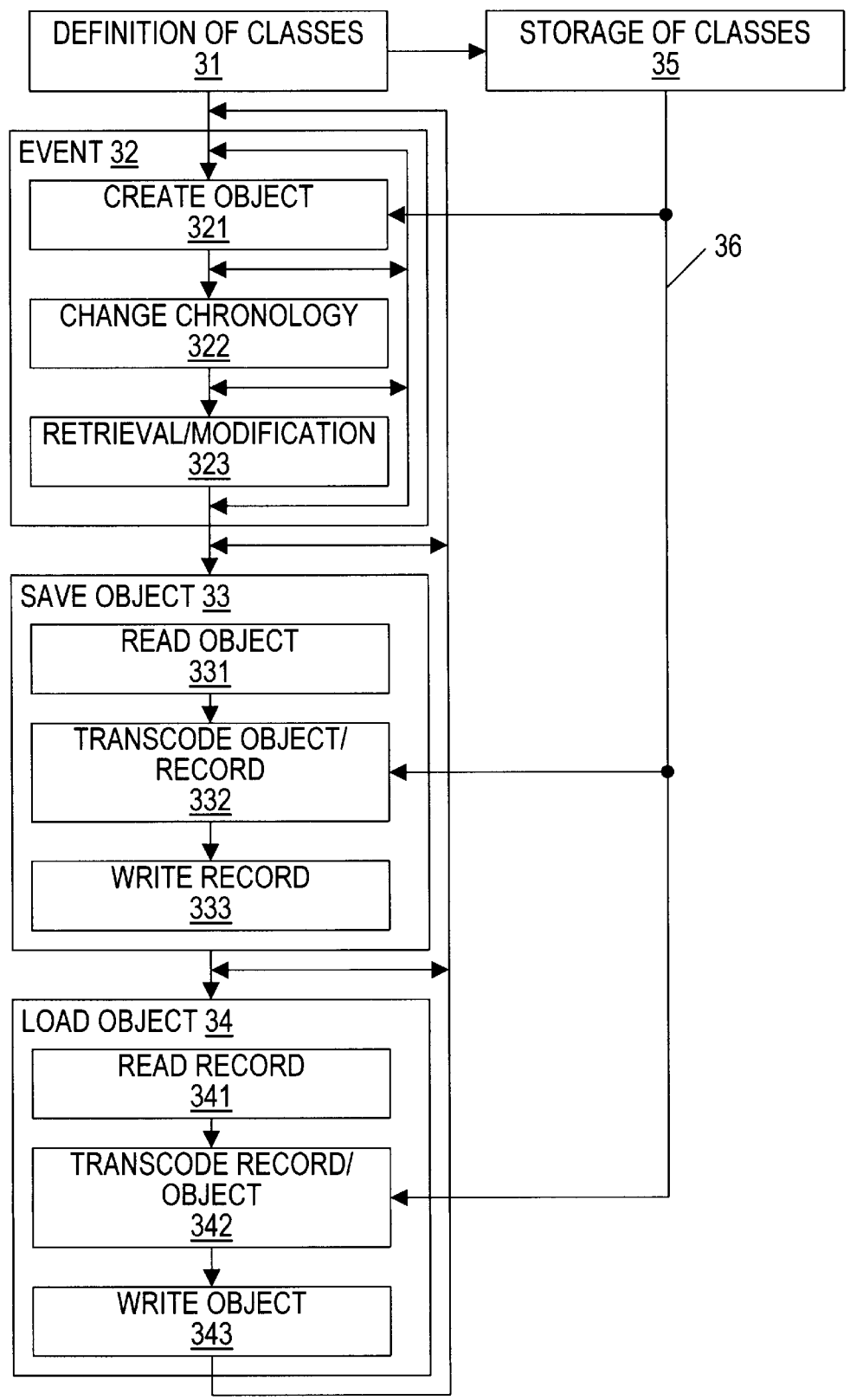

Other characteristics and advantages of the invention will become clear when reading the following non-limitative description of a preferred embodiment of the invention given for illustration purposes, and the accompanying drawings, in which:

FIG. 1 is a block diagram illustrating the general structure of the system in the invention;

FIG. 2 schematically shows the links between an object class and a table in the data base in the system in FIG. 1;

FIG. 3 presents the process according to the invention, in the form of a simplified flowchart;

FIG. 4 illustrates the principle of chronological management of objects in the invention.

Therefore, the invention concerns a relational data base control system making use of an object oriented concept. In other words, the system according to the invention automatically and transparently sets up a bridge between relational data bases and the objects universe. Thus:

a user manipulates data in the form of objects only;

data are stored in a conventional relational data base.

FIG. 1 schematically shows the system according to the invention.

The essential characteristic of the system according to the invention is that it allows control of a conventional relational data base 11 (for example in the ORACLE format (registered trademark)), without the user having direct access to the data base. On the contrary, the user dialogues (12, 13) with the object oriented control unit 14. The user only manipulates (in other words retrieves and/or modifies) objects that are stored in temporary storage unit 15, making use of control unit 14.

Thus, the system according to the invention manages two quite distinct methods of representation and storage:

mode I based on representation by objects, that is the only mode accessible to the user;

mode II corresponding to relational data bases, which are managed entirely automatically by control unit 14.

The link between the two modes is made by transcoding unit 16, which makes a data base record 11 starting from an object 18 stored in temporary storage unit 15, and vice versa.

This transcoding 16 is not a simple systematic adaptation of the format. On the other hand, it takes account of the class of this object for each object in the structure 19. Object classes 110 defined by the control unit 15 are stored in object class storage unit 111.

In other words, transcoding unit 16 operate under the constraint of the object classes definition 19.

Control unit 14 uses an object knowledge representation based on a "Class-Instance" model; a class consists of a list of attributes, behaviors (methods) and structures (variables). In particular, this representation groups the following functions:

Inheritance: which allows reuse of the structure and behaviors (more compact code, easier maintenance);

Specialization: so that the system can be upgraded consistently and soundly;

Encapsulation: this characteristic associates a behavior with a structure, and also defines attributes as being public or private;

Reflexes: formulas for deduced fields, input constraints.

Manipulated objects 112 have an associated implementation in the data base 11. Control unit 14 includes a data base control subassembly 113, which automatically manages the data base 11. More precisely, subassembly 113 carries out the following operations:

Generation of commands 114 depending on the data base 11 access logic (or control language) as a function of requests 12 made by the user in accordance with an object oriented access logic;

Lock management, to prevent access to records associated with an object stored in temporary memory 15 and which has been modified.

Since objects are stored in temporary storage unit 15 for subsequent processing, the number of queries to the data base 11 is very small compared with conventional data base management systems. Several operations may be carried out on an object although it was only loaded once (through transcoding unit 16). In practice, during a work sequence objects are transcoded when they are not in temporary storage unit 15, and are not stored in the data base again in the form of their associated record until the end of the sequence. Furthermore, to further simplify the dialogue with the data base 11, the control subassembly 113 manages a command memory 115 which keeps the most recent commands generated by subassembly 113. Thus when the user sends a query similar to a previous query, subassembly 113 does not need to recreate the command in the corresponding data base, it simply repeats and adapts the command stored in memory 115.

As soon as an object has been modified in temporary storage unit 15, subassembly 113 automatically sends a locking command preventing the corresponding record from being modified in the data base 11. Thus, for example in the case of a multi-user application, a second user can retrieve this object but cannot modify it.

FIG. 2 illustrates the construction of an object class, and its links with the data base table associated with it.

An object class 21 may include the following attributes:

Methods $22_1$ to $22_N$ which define a message which may be sent to the object;

Stored variables $23_1$ to $23_M$ containing representative values of an object;

Deductive variables $24_1$ to $24_L$ containing calculated values not stored systematically starting from stored variables and/or external values (for example processing date).

A large number of instances $25_1$ to $25_i$ or objects may be created from this class. A database table 26, in which a record $27_1$ to $27_i$ is associated with each object $25_1$ to $25_i$, is associated with each class, or possibly group of classes, particularly when these classes were created using the inheritance mechanism starting from a father class.

These records are very much simpler than the objects. They only include M fields $28_1$ to $28_M$ corresponding to M stored variables $23_1$ to $23_0$, thus providing a large saving in the size of the data base memory.

However, it is understood that the transcoding unit needs to carry out a large number of operations, since when it receives a record 17 it must perform the following operations to create the corresponding object 18:

Read the structure of the object in classes memory 111;

Associate its methods $22_1$ to $22_N$ with it;

Transcribe the values of stored variables $23_1$ to $23_M$ using fields $28_1$ to $28_M$;

Determine the values of deductive variables $24_1$ to $24_L$.

For example, in the case of an object corresponding to a person, there is no need to store the "title" variable, which may be equal to "Mrs.", "Miss" or "Mr.", since it can be deduced from the "sex" ("Male" or "Female") and "status" ("Bachelor," "Married," "Divorced," "Widow") stored variables.

The process used according to the invention is shown more clearly on the simplified algorithm in FIG. 3. Note that this process is presented in the form of successive steps only to make it easier to understand. There is nothing compulsory in the order of these steps, and more generally that some steps may be repeated several times and may even be carried out simultaneously.

Firstly, this process includes a class definition step 31. This step 31 is usually reserved for application developers, unlike steps 32 to 34 which are described later and which are accessible to all system users.

A class definition 31, includes the developer's definition of the class structure (methods and variables). This definition may be made starting from a mother class using the inheritance mechanism. When the class is defined, the corresponding record in the data base is created automatically, and the class structure is stored (35) in the system memory.

A system user works on events 32. An event is processing that represents an entry point into an application and usually consists of triggering messages on objects. It may be defined in retrieval, simulation or modification mode, which defines data modification (and save in base) possibilities during the event.

To highlight the characteristics of the invention, save steps 33 and load steps are shown independently of the event 32. During the event 32, most of the operations are carried out on objects independently of the data base. However, it is obvious loading and saving may be done during an event whenever necessary.

Therefore, an event 32 may include the following operations:

Object creation 321, conventionally, from the class structure 36;

Chronology modification 322 in order to place the event at any time in the past, present or future. This technique is described in more detail later, with reference to FIG. 4;

Retrieval and modification 323 of objects stored in the temporary storage unit. This step consists of sending messages (corresponding to methods) to objects. Each message sent to an object can cause propagation of messages to related objects, in addition to its explicit effect. It can thus initiate reflexes (or actions) associated with the event. Propagation phenomena are centralized on classes, and they are activated completely transparently.

Step 323 automatically and transparently sets up a lock management mechanism in the data base.

The system is capable of managing processing by batches, all that is necessary is to very simply state the nature of the event. It can then manage memory as a function of this criterion. Interactive events or batch events are different only in triggering, and can activate the same messages. This structure thus guarantees operational consistency between real time events and batch processing.

The system controls the terminal step of transactions (cancel, save or confirm). Saving the transaction makes it possible to postpone its validation until later. Finally, a trace of executed events can be kept.

The chronology modification step 322 makes projections into the past (transparent use of the history) and into the future (simulations or assumptions) quite naturally, and facilitates production operations in the present.

The system directly manages objects in time. It can thus find the situation of any object at any date in the past or in the future, by means of simulations. Since time management is integrated transparently, any application will allow the user to position himself in the past or in the future, without it being necessary for him to code anything other than the rules of how values change, when they are unknown.

The designer has everything he needs to limit the number of history states that he keeps.

Archiving time changes to objects is particularly useful in management applications.

According to one beneficial characteristic of the invention, an object has a start and end which correspond to two points in time; therefore, there are two date-type start and end fields for each object, but these fields are not necessarily defined.

The object may be in different states between its start and its end; the values of its fields may change with time. Each state is characterized by the values of fields; if the value of a field is modified on an object, it will change to another state. Thus:

an object is in a certain state at a time t in its life;

an object will be in one or several states during its life.

The system can store the various states of an object. Histories of objects can be managed.

When an object class is defined 31, it is specified whether or not the objects in this class must be managed in history; the system keeps the successive states of objects that must be managed in history, in the data base.

A state, like an object, is characterized by start and end dates.

Time is managed by considering two types of dates:

the knowledge date; this is the date on which the system becomes aware of the information, the effective date; this is the date on which the system takes the information into account.

Objects are created, modified or deleted during an event, which must be associated with a knowledge date and an effective date.

The meaning of dates is not quite the same during read and write accesses in the base:

write into data base: dates are defined as above;

read from data base: the information retrieved is the information as it is known as a function of the knowledge date, and such that it is effective at the read effective date.

The distinction between the effective date and the knowledge date can be used to manage retroactive effects (write with effective date prior to the knowledge date).

A state is characterized by start and end dates. Therefore each object includes the following technical fields:

EDN: effective start date for the state,

KDN: knowledge start date for the state,

EDX: effective end date for the state,

KDX: knowledge end date for the state.

The effective and knowledge "end" dates for one state are the same as the effective and knowledge "start" date for the next state.

When an object managed in history is retrieved, we see the most recent state of the object satisfying:

Read knowledge date equal to or later than the knowledge date for the state (EDN), and Read effective date equal to or later than the effective date for the state (KDN).

In order to see values, the read effective date must also be between the object start and end dates.

FIG. 4 shows an example of management with history for an object in the "person" class. Miss Mathilde DURAND has been known since Feb. 1, 1990. She informs the data base manager that she will be married to Mr. DUPOND on Jun. 15, 1990. On Jun. 5, 1992, she informs it that she was divorced on Apr. 25, 1992.

Therefore, we have:

Object start date=1st effective date=1st knowledge date (ED1 and KD1)

Object end date=99/99/9999 (equivalent to infinity)

Therefore, the object contains three states:

*STATE 1: Miss DURAND is not married:
    EK1=knowledge start date for the state
    ED1=effective start date for the state
Values of variables:
    name=DURAND
    given name=Mathilde
    title=Miss
    status=bachelor
*STATE 2: Miss DURAND became Mrs. DUPOND:
    EK2=knowledge start date for state 2 (and end date for state 1)=Feb. 1, 1992
    ED2=effective start date for state 2 (and end date for state 1)=Jun. 15 1992
Values of variables:
    name=DUPOND
    given name=Mathilde
    title=Mrs.
    status=married
*STATE 3: Mrs. DUPOND is divorced, and she keeps her married name.
    EK3=knowledge start date state 2 (and end of state 1)=Feb. 1, 1992
    ED3=effective start date for state 2 (and end of state 1)=Jun. 15, 1992
Values of variables:
    name=DUPOND
    given name=Mathilde
    title=Mrs.
    status=divorced.

We will give three examples of retrieving the history:

---

Retrieval 1:
    EK2 > read knowledge date > EKI
    And ED2 > read effective date > ED1
        we see state 1 of the object (Miss DURAND)
Retrieval 2:
    Read knowledge date > EK2
    but read effective date < ED2
        we cannot see state 2
    read knowledge date > EKI
    and read effective date > ED1
        we see state 1 (Miss DURAND)
Retrieval 3:
    EK3 > read knowledge date > EK2
    and read effective date > ED3 > ED2
        we see state 2 of the object (Miss DUPOND married)

---

An object stored in temporary memory is usually saved 33 at the end of an event. It consists of three steps, carried out automatically by transcoding unit 16:

Read 331 the object and its associated record, taking account of the class structure 36 of the object;

write 333 the transcoded record in the data base 11.

An object is symmetrically loaded 34 in temporary memory 16. Therefore, it includes the following steps:

read 341 the record associated with the object concerned, in the data base;

Transcode 342 the record to the object, as a function of the class structure 36 of the object;

write 343 the object in temporary storage unit 15.

An object may be loaded 34 at any time during an event. More precisely, the data base control subassembly 113 generates a change request whenever necessary, in other words when the user sends a query 12 concerning an object which is not yet in the temporary storage unit 15.

Therefore, the control unit transparently manages a list of objects in temporary storage unit 15.

However, in order to reduce the number of accesses to the data base 11, an object search using a specific criterion is made in two steps. Firstly, the search takes place among objects stored in the temporary storage unit 15. Then, and only if the search fails, it continues in the data base 11 under the control of subassembly 113.

We claim:

1. Method for controlling a relational data base limiting the number of accesses to the said data base, the said data base being stored in a first storage unit controlled in accordance with a first relational access logic and including at least one series of records, each of the said records including at least one data field, each one of the said records being associated with an object including at least one variable and at least one method for affecting the value of at least one variable, the said method including the following steps:

defining one or more object classes, each object class defining an object structure;

creating instances of a class, or objects, from one of the said object classes;

loading at least one object in the second temporary storage unit including the following steps:
read a record corresponding to one of the said objects, in the said first storage unit;
first transcoding of the said record to the said object as a function of the structure of the class of the said object, at least some variables of the said object corresponding to at least some of the said data fields in the said record;
write the said object in the said second temporary storage unit;

retrieval and modification of at least one variable of at least one object stored in the said second storage unit, in accordance with the said second access logic using the said methods;

save at least one record corresponding to at least one object stored in the said second storage unit, in the said first storage unit, including the following steps for each record;
read the objects corresponding to the said record in the said second storage unit;
second transcoding of the said object to the said record, as a function of the class structure of the said object, at least some variables of the said object corresponding to at least some of the said data fields in the said record;
write the said record in the said first storage unit, the commands to be applied to the said data base corresponding to the said first access logic being automatically generated from commands corresponding to the said second access logic given by an operator, method characterized in that data retrievals and/or modifications are made solely on the said objects in accordance with a second object oriented access logic, and characterized in that it includes a step for managing a history of at least some of the said objects, associating at least two different values to at least one variable of the said objects, each of the said values being associated with two technical fields, a knowledge date field representing the date on which the value of the said variable was known, and an effective date field representing the date on which the value of the said variable became effective.

2. Method according to claim 1, characterized in that it manages work sequences called events, an event including at least two loading steps and/or at least two retrieval and/or modification steps, and terminating with a single save step.

3. Method according to claims 1 or 2, characterized in that it includes an access control step to the records in the said data base, preventing modification of the record in the said data base by locking it, when an object associated with the said record is stored in the said second storage unit and was modified.

4. Method according to claims 1 or 2, characterized in that it includes an automatic command generator step according to the first access logic, including management of a cache memory storing a series of previously generated commands.

5. Method according to claims 1 or 2, characterized in that at least some of the said objects include:
at least one stored variable corresponding to a data field in the record associated with the said object; and
at least one deductive variable, the value of which is determined during the said first transcoding step starting from the value of at least one data field in the record associated with the said object and/or the class structure of the said object.

6. Method according to claims 1 or 2, characterized in that a search for at least one object satisfying a predetermined condition is carried out in two steps:
step one corresponding to a search among objects stored in the said second storage unit; and
if the search is not terminated, a second step in which a search is made among records stored in the said first storage unit.

7. Relational data base control system limiting the data base access count, the said data base being stored in a first storage unit controlled according to a first relational access logic and including at least one series of records, each of the said records including at least one data field,
said system whereby each of the said records is associated with an object including at least one variable and at least one method that can act on the value of at least one of the said variables, the said system comprising:
a second temporary storage unit for objects;
a control unit including:
a unit for defining object classes, an object class defining an object structure, and means of creating instances of a class, or objects, from one of the said object classes;
a unit for retrieving and modifying at least one variable in at least one object stored in the said second temporary storage unit, in accordance with the said second access logic, using the said methods;
a unit for automatically generating commands to be used with the said data base, in accordance with the said first access logic, starting from commands corresponding to the said second access logic; and
a unit for transferring data in each direction between the said first storage unit and the said second storage unit, and associating a record in the said data base with the said objects by transcoding, the said record including at least one field corresponding to a variable of the said object, the said transcoding being a function of the class of the corresponding object,
data transfers between the said first and second storage units being controlled by the said automatic command generator unit so as to limit the number of accesses to the said first storage unit,
the system characterized in that data retrievals and/or modifications are made solely on the said objects in accordance with a second object oriented access logic, and in that it includes a unit for managing a history of at least some of the said objects, associating at least two different values to at least one variable of the said objects, each of the said values being associated with two technical fields, a knowledge date field representing the date on which the value of the said variable was known, and an effective date field representing the date on which the value of the said variable became effective.

8. System according to claim 7, characterized in that the same control means comprise means for managing locks preventing the modification of a file of the said database, when an object associated with the said file is stored in the said second storage means and has been modified by the said query and modification means.

9. System according to claims 7 or 8, characterized in that the said control unit manages work sequences called events, and the said automatic command generator unit sends a data transfer command from the said second storage unit to the said first storage unit only when an event is terminated.

10. System according to claims 7 or 8, characterized in that the said automatic command generator unit includes a cache memory storing a series of previously generated commands.

* * * * *

UNITED STATES PATENT AND TRADEMARK OFFICE
CERTIFICATE OF CORRECTION

PATENT NO. : 5,909,683
DATED : June 1, 1999
INVENTOR(S) : Jean-Charles Miginiac and Michel Planard It is certified that error appears in the above-identified patent and that said Letters Patent is hereby corrected as shown below:

In the Claims:

Claim 2, col. 10, line 2, please delete "sequences called events" and substitute therefor --sequences, referred to as events--.
Claim 2, col. 10, line 2, please delete "including" and substitute therefor --comprising--.
Claim 2, col. 10, line 3, please delete "loading steps" and substitute therefor --steps of loading--.
Claim 2, col. 10, lines 3 and 4, please delete "retrieval and/or modification steps" and substitute therefor --steps of querying and/or modification--.
Claim 2, col. 10, line 4, please delete "terminating with" and substitute therefor --ending in--.

Signed and Sealed this

Ninth Day of January, 2001

*Attest:*

*Attesting Officer*

Q. TODD DICKINSON

*Commissioner of Patents and Trademarks*